United States Patent [19]

Motta et al.

[11] 3,922,411
[45] Nov. 25, 1975

[54] HONEYCOMB REINFORCED MATERIAL AND METHOD OF MAKING THE SAME

[75] Inventors: Salvatore Motta; Bernard Walter Rosen, both of Lawrence; Thomas Vasilos, Winthrop, all of Mass.

[73] Assignee: Avco Corporation, Cincinnati, Ohio

[22] Filed: June 2, 1958

[21] Appl. No.: 740,987

[52] U.S. Cl. ............... 428/116; 102/105; 428/446
[51] Int. Cl.² ........................................... B32B 3/12
[58] Field of Search .... 18/485, 59 F, 59 PE, 59 PD, 18/59 PH, 53 S, 3, 5, 34, 39; 49/92, 92.5, 78, 86; 154/75, 2.3; 6/11; 25/154 A, 154 E, 154 M, 154 T; 253/77.3 A; 230/133; 60/54, 49; 89/36 A; 102/105; 161/68, 143, 196; 244/117 A, 163; 428/116, 446

[56] References Cited
UNITED STATES PATENTS

| | | | |
|---|---|---|---|
| 760,192 | 5/1904 | Gaylord | 18/59 |
| 1,156,214 | 10/1915 | Shuman | 154/2.3 |
| 1,197,474 | 9/1916 | Fullerton | 49/92.5 |
| 1,556,364 | 10/1925 | Smith | 49/92.5 |
| 1,624,386 | 4/1927 | Betts | 25/154 A |
| 1,935,584 | 11/1933 | Thurn | 49/86 |
| 2,027,457 | 1/1936 | Strutz et al. | 18/59 |
| 2,064,435 | 12/1936 | Loeffler | 18/59 |
| 2,196,109 | 4/1940 | Eastus | 49/86 X |
| 2,270,718 | 1/1942 | Skaupy | 49/78.1 |
| 2,405,590 | 8/1946 | Mason | 89/36 A |
| 2,669,860 | 2/1954 | Bell | 161/143 |
| 2,738,297 | 3/1956 | Pfistershammer | 161/68 |
| 2,744,042 | 5/1956 | Pace | 18/59 F |
| 2,787,809 | 4/1957 | Stastny | 18/48 S |
| 2,795,008 | 6/1957 | Lindemann et al. | 18/48 S |
| 2,828,235 | 3/1958 | Holland et al. | 49/92.5 |
| 2,860,740 | 11/1958 | Holland et al. | 161/68 |
| 2,939,275 | 6/1960 | Loedding | 102/98 |
| 3,068,016 | 12/1962 | Dega | 230/133 X |
| 3,116,137 | 12/1963 | Vasilos | 264/44 |

FOREIGN PATENTS OR APPLICATIONS 510,081   7/1939   United Kingdom ............... 49/78.1

Primary Examiner—Stephen C. Bentley
Attorney, Agent, or Firm—Charles M. Hogan, Esq.; Abraham Ogman, Esq.

[57] ABSTRACT

The present invention concerns an improved material, particularly one characterized by excellent thermal and mechanical shock resistance. More particularly, the invention concerns materials, especially brittle materials, reinforced by honeycomb structures, and a novel process for producing such materials. The invention is exemplified by blocks of hot-pressed fused silica situated within the openings of a metallic honeycomb material.

4 Claims, 8 Drawing Figures

SALVATORE MOTTA
BERNARD WALTER ROSEN
THOMAS VASILOS
INVENTORS

SALVATORE MOTTA
BERNARD WALTER ROSEN
THOMAS VASILOS
    INVENTORS

HONEYCOMB REINFORCED MATERIAL AND METHOD OF MAKING THE SAME

In the missile industry today there is an insatiable demand for improved materials that can withstand extremely high temperatures and thermal shock. Materials are also in demand which are ablation resistant and can withstand the abuse encountered in missile applications, particularly those involving nose cones which are subjected to high rates of heating during their re-entry into the earth's atmosphere. Although the demands made on such materials are extreme, and often divergent, it is possible to meet them by use of the present invention.

In the quest for satisfactory materials, cast vitreous non-crystalline, fused silical was considered. It is attractive from the standpoint of its low thermal coefficient of expansion, and hence its excellent shock resistance, but has low mechanical shock resistance and involves substantial problems in fabrication. As a result of such difficulties, attention was focused on sintering processes. A common method involves sintering of powdered quartz at a temperature sufficiently high to cause fusion welding of adjacent particles without converting all of the quartz to vitreous fused silica. Other processes involve presintering products from powdered quartz, followed by heating at temperatures sufficiently high to completely convert the product to vitreous silica. Several such processes are disclosed in U.S. Pat. No. 2,270,718 entitled "Article of Vitreous Quartz and Process for Producing and Working It" which issued to F. Skaupy on Jan. 20, 1942.

In the interest of clarity it is important to emphasize the difference between quartz and the vitreous form of silica which is referred to in this application as "fused silica". Although both substances are chemically $SiO_2$, there are marked differences in their physical characteristics. Whereas fused silica is ampophous and non-crystalline, quartz, which is usually alpha phase quartz, is crystalline and has a much larger coefficient of expansion than fused silica. As a result, articles made of sintered quartz fall far short of those made from fused silica in applications where thermal shock resistance is important. This led to a search for improved methods of making articles of fused silica.

After extensive research into the subject, a method was devised for satisfactorily sintering articles of fused silica. The method is more particularly set forth and claimed in presently pending application Ser. No. 745,982, filed by Vasilos et al, on July 1, 1958, and entitled "Hot Pressed Materil and Method of Producing the Same" now U.S. Pat. No. 3,116,137. The process involves hot pressing of powdered fused silica at temperatures between 1050°C and 1450°C and at pressures of 500 to 3000 psi for time periods which may vary from a few minutes to several hours, depending upon the articles being formed.

Although articles of fused silica can now be made much more easily, accurately, and economically than before, such materials are nonetheless brittle. Although in many applications the characteristics of a brittle material are in no way objectionable, they cannot be tolerated in many missile applications, particularly those involving nose cones. The tendency of the fused silica to crack under service conditions was considered prohibitive. This led to an investigation of many types of reinforcements for silica. It was finally discovered that a highly satisfactory material can be made by embedding a honeycomb reinforcing structure in the silica, thereby greatly improving its thermal shock resistance and imparting sufficient mechanical shock resistance to it to make it useful for nose cones.

Metallic honeycomb lends itself excellently to hot pressed fused silica. The honeycomb reinforcement can be compressed simultaneously with the silica resulting in a compact material in which the fused silica is intimately engaged with the honeycomb and mechanically held by it in a rigid structure. Depending upon the nature of the article to be formed, the honeycomb may be compressed in a direction parallel to the length of its cells. During such compression, the walls of the honeycomb buckle slightly and may be crimped to form numerous projections engaging the compressed fused silica, keying it securely in place. As an alternative, pressure may be applied normal to the length of the cells, resulting in lateral distortion of the cells without buckling or crimping.

A material reinforced in this manner has greater thermal shock resistance than fused silica and is not susceptible to brittle failure as is an article made without reinforcement. Cracking, such as might conceivably result from impact by a foreign body or vibration, is limited to the dimensions of an individual cell of the honeycomb and does not propagate itself across the full dimension of the article. Further, the silica is free to expand within the individual cells with less restraint than present in a solid mass. Improved thermal shock resistance results which is important at the extreme rates of heat input encountered by nose cones. At such inputs, even the extremely low expansion of fused silica is a problem in massive structures.

The compact material within the cells is so securely engaged by the honeycomb that a rigid structure results, so rigid in fact that it can be machined and formed with sharp edges and corners without separation of the silica from the reinforcement. This is true even though a machined surface cuts diagonally across the cells of the honeycomb reinforcement.

As will be obvious to those skilled in this art, this novel concept of producing a honeycomb reinforced material is not limited to the use of fused silica but can be applied to advantage with other materials which can be compressed simultaneously with the honeycomb to form an interlocked unified structure, or which can be sintered in place within the honeycomb. On the other hand, a honeycomb reinforced article of fused silica has particular advantages rendering it highly useful in the missile industry and in industry generally. To illustrate, in addition to the thermal shock resistance of the silicon dioxide, it also vaporizes at extremely high temperatures and in so doing absorbs large amounts of heat. In this way, such a material can form a protective heat absorbing layer for a nose cone during the re-entry period. For this reason it will be understood that the present invention is described with the particular combination of metallic honeycomb and fused silica.

The low coefficient of expansion of fused silica results in another benefit when it is reinforced by metallic honeycomb structure. During the hot pressing process, both the honeycomb and the silica are at a uniform elevated temperature. As cooling occurs after compression, the silica undergoes practically no dimensional change but the honeycomb contracts to a significant extent. This places the honeycomb in tension and applies compression directly to each of the elements or "pencils" of silica which are securely gripped within the cells of the honeycomb.

This effect is present whenever the reinforcing structure or matrix has a coefficient of expansion larger than that of the material that is reinforced by it.

Another valuable advantage resulting from the use of the fused silica is that the hot pressing may be carried out at a relatively low temperature. This not only avoids formation of cristobalite, an objectionable crystalline form of silica, in the fused silica, but also makes possible use of reinforcing materials that would not be capable of withstanding the fusion temperature of silica which is in excess of 1625°C. At such elevated temperatures, reinforcements must be made from refractory metals such as molybdenum or platinum.

Although this invention will be described with particular reference to hot pressing of silica within a metallic honeycomb structure, it should be clearly understood that the invention is not limited to such materials or processes. Many of the advantages of the invention can be attained by sintering or cold pressing materials within a honeycomb reinforcement. The exact form of the honeycomb is also of little consequence. Individual honeycomb cells may be hexagonal in cross section, rectangular, or have any other desired form.

As will be described in detail in the specification, reinforced material may be formed with or without the honeycomb projecting from its surface. Materials made with the honeycomb projecting may be readily attached to other members or may be used to define insulating air spaces between the material and another member.

In view of the foregoing, it will be understood that a broad object of the present invention is provision of an improved material reinforced by a honeycomb structure and more specifically that it is an object of the invention to provide a material made of fused silica reinforced by a metallic honeycomb.

Another broad object of the invention is the provision of a process for making material reinforced by a honeycomb structure, and more specifically a novel process for forming an article of fused silica reinforced by a metallic honeycomb.

Other objects include:
a. Provision of a material comprising a plurality of brittle elements secured within a ductile matrix.
b. Provision of a material comprising a plurality of discrete elements held under compression by a surrounding matrix under tension.
c. Provision of a compressed material which is reinforced by a compressed honeycomb matrix.
d. Provision of a compressed material which is reinforced by a distorted honeycomb matrix.
e. Provision of a honeycomb reinforced material from the surface of which the honeycomb projects.
f. Provision of a sintered article having a mechanically interlocked reinforcing structure.
g. Provision of a process for making a sintered fused silica article reinforced by a relatively low temperature material.
h. Provision of a honeycomb reinforced material of fused silica having a controlled degree of porosity.

The novel features that are characteristic of the invention are set forth in the appended claims. The invention itself, however, together with additional objects and advantages thereof, will best be understood from the following description of specific processes and embodiments when read in conjunction with the accompanying drawings, in which:

PROCESS FOR HOT PRESSING FUSED SILICA

It has been found that dense articles exhibiting many of the desirable characteristics of glassy, vitreous silica, can be made by hot pressing powdered fused silica at temperatures in the range of 1050°C–1450°C and pressures of 500 to 3000 psi. The pressing operation can be accomplished in a relatively few minutes or over a period of several hours depending upon the particular characteristics of the material that are desired. The process can be carried on in an ordinary atmosphere, or in a vacuum, or any other atmosphere, such as a hydrogen atmosphere, that may be desired. Since the process is carried on below 1470°C, no cristobalite is formed and, since the initial material is fused silica, there is little or no tendency to form tridymite, another crystalline form of silica.

The fused silica which is employed is finely ground vitreous silica glass. The particle size that is used is not critical and may be between 1 micron and 1000 microns. Particle size can be adjusted for the particular material characteristics which are desired. Generally speaking, the use of an admixture of fine and coarse particles will favor the formation of a denser material since the fine particles fill the voids between the coarse ones. Increased density of material is favored by:
a. high processing pressures
b. long processing time
c. high processing temperature (within the recommended range)

To illustrate, a translucent, almost transparent, material can be formed by hot pressing fused silica at 1250°C at 2000 psi for a period of 3 hours. The fused silica may be a half-and-half mixture of particles of $-210+105$ micron size and $-105+45$ micron size.

Hot pressed articles can be made with significant strength. To illustrate, such a material with 3% porosity has been made having a Modulus of Rupture of 7000 psi.

Figure 1:
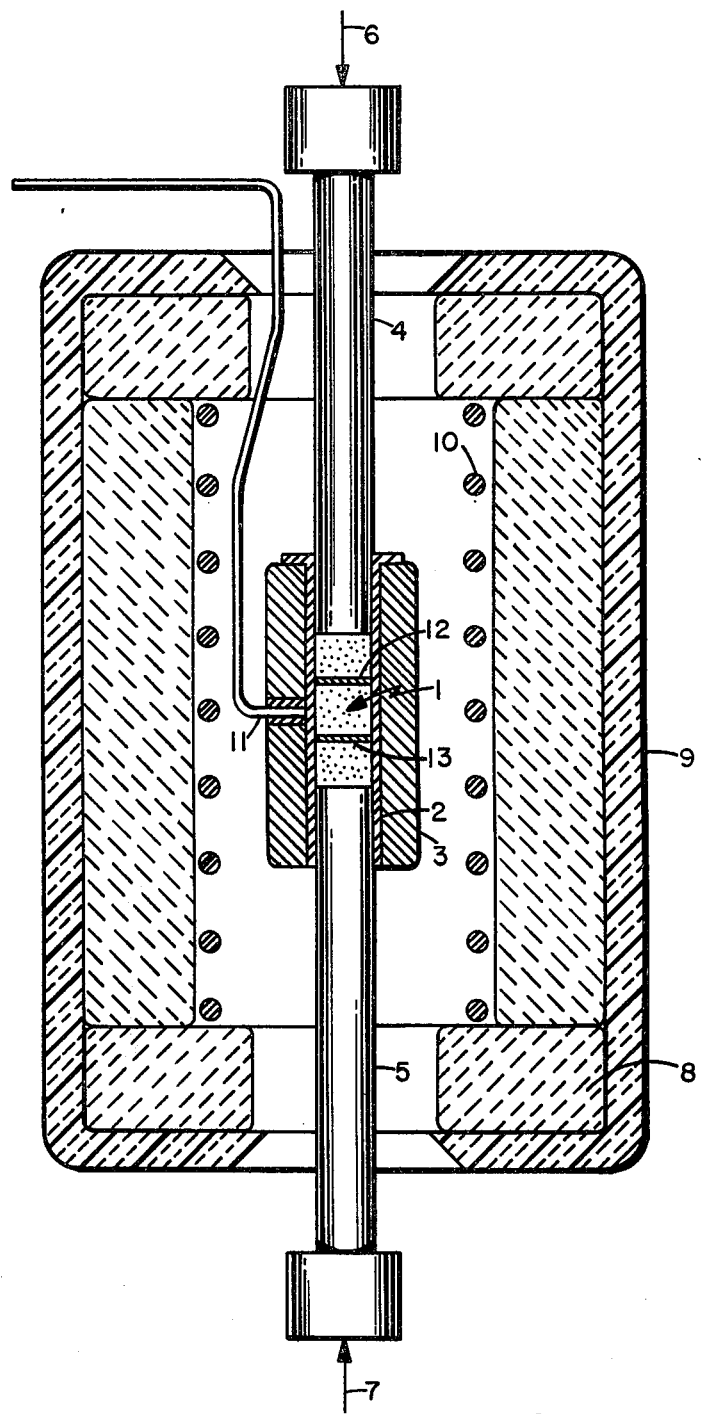
FIG. 1 is a vertical sectional view through a press and furnace for hot pressing materials.

Turning attention now to FIG. 1, there is shown a press for hot pressing articles of fused silica. The powdered fused silica is indicated generally at 1, confined within a graphite sleeve or die 2, which in turn is supported by a graphite die body 3. A pair of graphite punches 4 and 5 are slidably supported by the sleeve and serve to compress the powdered silica when pressure is applied to the punches by the rams of a hydraulic press (not shown), as suggested by arrows 6 and 7.

The graphite die body and fused silica are surrounded by fire brick 8 which in turn is held in position by quartz insulation 9. The insulation and fire brick form a furnace surrounding the die which may be heated in any suitable manner, as by electrical resistance heater 10 or by an induction heater. A thermocouple is shown at 11 to measure the temperature of the carbon sleeve adjacent the fused silica.

In FIG. 1 graphite partitions 12 and 13 are shown within the confines of the graphite sleeve. Through use of such partitions, it is possible to make more than one, for example three, in the case illustrated, articles of fused silica simultaneously.

In practice, the fused silica is confined within the carbon sleeve by the punches and the furnace is assembled as illustrated. Pressure is then applied to the fused silica and the temperature is maintained for the desired period by the heating element. Because of the low expansion rate of fused silica, the articles may be removed from the dies as soon as the compression process is completed.

It is important to note that the articles formed in this manner have great dimensional accuracy and stability. They will assume and hold exactly the dimensions of the carbon sleeve or other die that may be used. By use of graphite dies, which do not oxidize significantly at the temperatures involved even in an air atmosphere, die deterioration is not a significant problem.

REINFORCEMENT OF COMPRESSED MATERIAL

Figure 2:
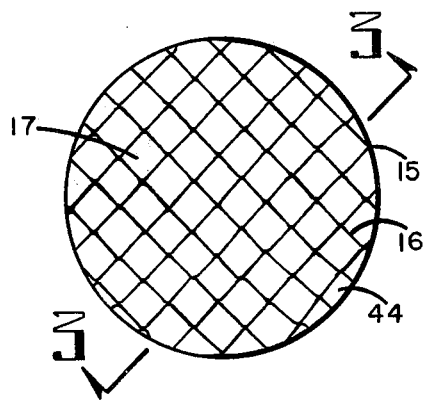
FIG. 2 is a top plan view of a disc of honeycomb reinforced material.
Figure 3:
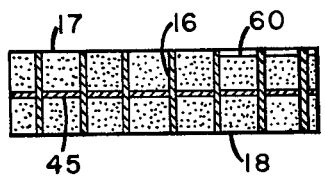
FIG. 3 is a cross sectional view of the disc taken on plane 3—3 of FIG. 2.

Reinforcement of hot pressed materials by honeycomb structures has been found to be particularly effective. Shown in FIG. 2 is a disc 15 of a hot pressed material, such as fused silica, within which a honeycomb structure 16 is intimately embedded. As illustrated by FIG. 3, the reinforcement 16 may extend from one face of the material 17 to the opposite face 18, or may project from the reinforced material as will be explained shortly.

Figure 7:
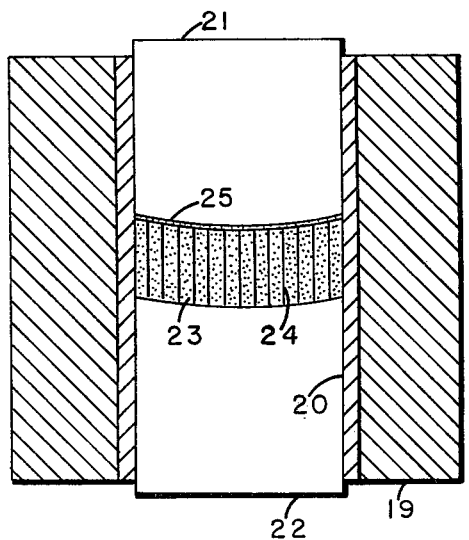
FIG. 7 is a cross sectional view through a set of dies for hot pressing honeycomb reinforced fused silica, the view showing the die positions before compression; and, FIG. 8 is a view similar to FIG. 7 showing the dies in the position assumed after compression.
Figure 8:
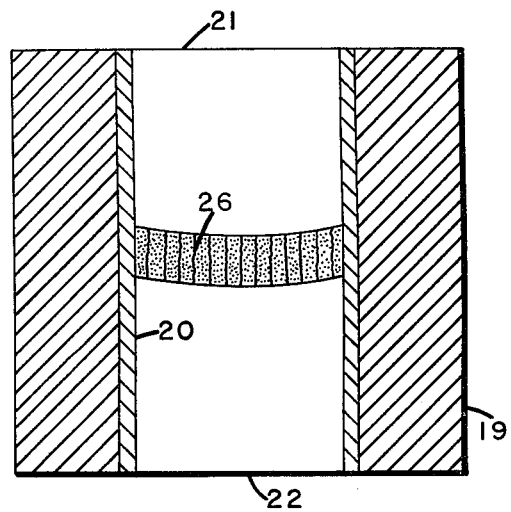

Attention should now be directed to FIGS. 7 and 8 which illustrate use of a pair of graphite punches in forming a honeycomb reinforced compressed article. With particular reference to these figures, a graphite die body 19, comparable to die body 3 of FIG. 1, supports graphite sleeve 20 within which a pair of contoured punches 21 and 22 are slidably disposed. Between the punches is confined a quantity of powdered fused silica 23 within a honeycomb reinforcing structure 24. Sufficient silica is added to completely fill the honeycomb with a slight excess above the honeycomb, indicated at 25. Vibration may be employed to assure complete filling of the honeycomb.

It will be noted that, prior to compression, the vertical walls of the honeycomb structure are planar and relatively free from distortion; after compression, however, the walls are distorted by buckling and crimping as suggested by the irregular lines indicated at 26 in FIG. 8. In other words, the punches in compressing the fused silica, also compresses the honeycomb structure. A compression ratio that has been found to be very satisfactory is 1-½:1 (ratio of vertical dimension before and after pressing). In other words, a honeycomb structure which is 1-½ inches high prior to compression, is reduced to 1 inches in height after compression. This is an important aspect of the invention since secure interlocking of the compressed silica and its reinforcing structure results.

HONEYCOMB DISTORTION IN COMPRESSED MATERIALS

Figure 5:
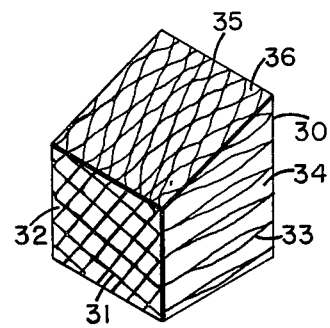
FIG. 5 is a perspective view of a honeycomb reinforced block of material.
Figure 6:
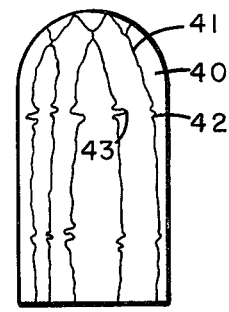
FIG. 6 is a side elevational view of a cylinder of honeycomb reinforced material.

The distortion of the honeycomb during the pressing operation is particularly well illustrated by FIGS. 5 and 6. In FIG. 5, a block of hot pressed fused silica 30 is shown intimately reinforced by honeycomb 31. The honeycomb, which extends substantially normal to face 32 of the block, has been buckled during the compression normal to that face, as illustrated by the divergent walls 33 of the honeycomb, exposed by machining of face 34. This is one form of distortion which locks the included silica firmly between the walls of the honeycomb. So securely interlocked is the material, in fact, that it may be machined to form sharp corners and sharp edges, such as illustrated at 35 in FIG. 5, without separation at the corners or in regions such as indicated at 36, where the silica is exposed and is not completely surrounded by the honeycomb. The importance of edge strength is apparent particularly with respect to the fabrication of components which may be joined to form a smooth composite structure.

Another form of distortion is illustrated by FIG. 6. The cylindrical specimen comprises fused silica 40, reinforced by honeycomb 41, compressed in the ratio of 1.8 to 1. With the larger compression ratio not only does buckling occur as illustrated by FIG. 5, but crimping of the honeycomb also is present as shown at 42. Such crimping forms numerous projections 43 which intimately engage the compressed material and hold it securely in place. Not only does macroscopic crimping occur as at 42, but also microscopic crimping occurs which tends to securely engage the compressed material along all surfaces of the honeycomb.

With the foregoing in mind, FIGS. 2, 5 and 6 should be carefully studied. It will be noted that in FIG. 2 the exposed portions of the material 44 are held securely in place. Machining of planar faces, even at an angle to the axis of the honeycomb, as illustrated by FIG. 5, and machining of spherical surfaces, such as illustrated by FIG. 6, do not expose any planes or dimensions of weakness in which separation of the compressed material from the reinforcement occurs.

REINFORCING MATERIALS

The honeycomb structure may be made from any suitable material, particularly a material which is suitable for the working temperatures to be encountered. Depending upon the application involved, either a metal or a non-metal may be used. For reinforcing fused silica, nickel may be used, or a material such as inconel (80% nickel, 5% iron, and 15% chromium). Such materials are suitable since the hot pressing of fused silica is carried out at relatively low temperatures, i.e., below 1450°C. This is obviously desirable since higher temperatures would necessitate more expensive materials, such as platinum.

The form of the honeycomb is not critical. For purposes of illustration, honeycomb of rectangular cross section is shown in FIGS. 2 and 5. Honeycomb of hexagonal shape, or any other desired shape, may be used.

It should also be noted that the honeycomb may be used to reinforce articles which are not flat. This is illustrated by FIGS. 7 and 8. The honeycomb of FIG. 7 can be machined to the curved configuration illustrated so that defining walls of the honeycomb are truly axial, or the honeycomb may be distorted to a curved configuration. For additional reinforcement of compressed materials, or for reinforcement of those which are not compressed, and hence not distortion of honeycomb is present, wires 45 may be transversely threaded through the honeycomb as illustrated by FIG. 3.

POROSITY

Figure 4:
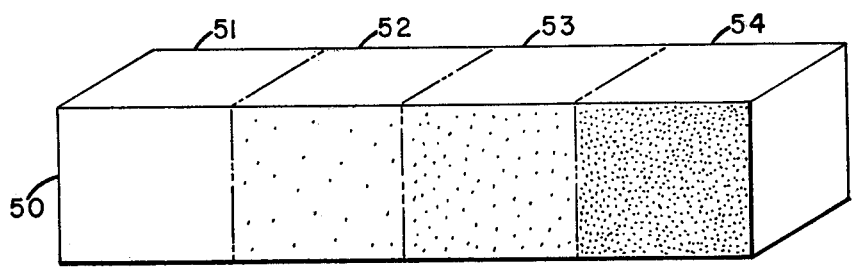
FIG. 4 is a perspective view of a sintered article having zones of different porosity.

Porosity of the material as formed can be controlled both through pressure and temperature, as has been indicated, or by inclusion of a foreign substance which can be burned away after the compression process to leave voids in the final structure. Not only can the porosity of a given article be controlled over wide limits, but a single article can also be made having zones of different porosity. This is illustrated by FIG. 4. The bar of material 50, shown in longitudinal section, has one zone 51 at its left end having less than 5% porosity; zone 52 has 5% to 15% porosity; zone 53 has 15% to 25% porosity and zone 54 has 25% porosity. These various zones may be produced in a single article as follows:

Zone 51

This may be formed by hot pressing fused silica at 1200°C and 3000 psi for a period of 2 hours.

Zone 52

This may be formed by compression at 1200°C and 2000 psi for a period of 1 hour.

Zones 53 and 54

These zones may be formed at 1200°C and 2000 psi for a period of 1 hour, a quantity of finely powdered graphite being included in the material of each zone prior to compression. Obviously, about twice as much graphite would be included in zone 54 as in zone 53.

It will be noted that zones 52, 53 and 54 are all formed at the same temperature and pressure during an identical compression time. Thus, after formation of zone 51, fused silical may be added to the die to form zone 52, and fused silica bearing graphite can be added to form zones 53 and 54, and the composite compressed for a period of 1 hour at 1200°C and 2000 psi. After the end of the compression process the resulting article can be fired at 1700° Fahrenheit for a period of 48 hours to burn away the graphite inclusions, resulting in the desired graduated porosity in the final article. It will be obvious that the size of the graphite particles may be chosen at will to provide voids of any desirable size. Actual experiments have shown, however, that porosity is easily controlled by using graphite having a particle size of 80 to 200 microns.

By use of the foregoing techniques with honeycomb, a reinforced porous material may be readily produced. Inclusion of the honeycomb in no way complicates or detracts from the formation of such porous materials.

OTHER FORMS OF REINFORCED MATERIALS

To this point, primary emphasis has been placed on reinforcement of hot pressed fused silica by a distorted honeycomb structure. It will be apparent to those skilled in the art that advantages may also be gained by filling the honeycomb with powder and sintering the powder at an elevated temperature without the application of pressure. Since no distortion of the honeycomb will then be present, wires, such as shown at 45 in FIG. 3, may be used for reinforcing purposes, or the compression of the sintered material by the honeycomb under tension may be relied upon. Since a significant difference exists between the coefficient of expansion of most metals and refractory materials such as silica, the honeycomb will contract during cooling after the sintering process. This will place the honeycomb in tension and apply compression uniformly to each element or "pencil" of the reinforced material. This beneficial attribute of the honeycomb is present whether the material is sintered with or without compression and serves to make a tightly integrated, unified structure. In fact, such compression of reinforced material will exist whenever the coefficient of expansion of the honeycomb exceeds that of the material being reinforced.

Honeycomb may obviously be used to reinforce a wide variety of materials whether made by hot pressing or sintering without pressure, or by any process which causes the material to be reinforced to harden within the honeycomb.

In some instances it may be desirable to have the honeycomb project slightly from the surface of the reinforced material, as indicated at 60 in FIG. 3. Such a structure is easily fabricated in the case of sintering without compression simply by incomplete filling of the honeycomb prior to heating. In the case of hot pressing processes, as in making hot pressed fused silica, the spaces at 60 may be created by filling them prior to compression with a substance such as zirconium dioxide which does not sinter at the temperature and pressure of the forming process. After hot pressing, the zirconium dioxide can readily be removed, exposing the honeycomb.

A structure with the honeycomb exposed may be used to advantage where it is desirable to join the reinforced structure to a base member either by welding or cementing of the honeycomb to the base member. Further, the spaces, such as 60, form insulating air spaces which may be highly desirable for applications where heat transfer is a problem.

Having described our invention, we claim:

1. An improved material comprising fused silica, the amorphous phase of silicon dioxide, a honeycomb structure, said fused silica being a solidified block and inserted in the interstices of said honeycomb and transverse reinforcing members secured to said honeycomb and extending through the interstices of said honeycomb and said fused silica.

2. A material as defined in claim 1 in which said transverse members are wires.

3. A material as defined in claim 1 in which said transverse members constitute laterally distorted honeycomb walls in secure engagement with the aforesaid fused silica.

4. A material as defined in claim 1, in which said fused silica block is a block of hot pressed fused silica.

* * * * *

UNITED STATES PATENT OFFICE
CERTIFICATE OF CORRECTION

PATENT NO. : 3,922,411
DATED : November 25, 1975
INVENTOR(S) : Salvatore Motta et al It is certified that error appears in the above-identified patent and that said Letters Patent are hereby corrected as shown below:

Column 1, line 18, patent should read ---thermal--- after "excellent".

Column 1, line 38, patent should read ---amorphous---.

Column 1, line 51, patent should read ---Material---.

Column 7, line 2, patent should read ---no---.

Column 7, line 18, patent should read ---to 50% porosity--- after "25%".

Column 7, line 39, patent should read ---silica---.

Signed and Sealed this second Day of March 1976

[SEAL]

Attest:

RUTH C. MASON
Attesting Officer

C. MARSHALL DANN
Commissioner of Patents and Trademarks